United States Patent
Edwards et al.

[11] Patent Number: 5,857,244
[45] Date of Patent: Jan. 12, 1999

[54] FASTENER WITH MOLDED-ON COMPLIANT SEAL

[75] Inventors: Brian Edward Edwards, Struthers; Steven Williams, Warren, both of Ohio

[73] Assignee: General Motors Corporation, Detroit, Mich.

[21] Appl. No.: 902,877

[22] Filed: Jul. 30, 1997

[51] Int. Cl.⁶ ..................................................... F16B 19/00
[52] U.S. Cl. .................................. 24/297; 24/453; 248/71
[58] Field of Search ............ 24/297, 453; 411/508–510; 248/74.1, 68.1, 73, 74.2, 71, 74.3

[56] References Cited

U.S. PATENT DOCUMENTS

| | | | |
|---|---|---|---|
| 2,983,008 | 5/1961 | Von Rath | 24/297 |
| 4,195,807 | 4/1980 | Llauge | 248/74.2 |
| 5,173,026 | 12/1992 | Cordola et al. | 24/297 X |
| 5,217,337 | 6/1993 | Junemann et al. | 24/297 X |
| 5,419,606 | 5/1995 | Hull et al. | 24/297 X |
| 5,647,713 | 7/1997 | Ge et al. | 411/509 |

Primary Examiner—James R. Brittain
Attorney, Agent, or Firm—Cary W. Brooks

[57] ABSTRACT

The invention includes a fastener with a molded-on compliant seal having a fastener portion including a shaft and an insertion head at a first end for extending through an apertured panel and locking against a rear face thereof. A base for attaching an object thereto is provided at the second end of the shaft. A rigid seal support extends outwardly from the shaft at a location between the first and second ends. The fastener portion including shaft, insertion head, base and seal support are preferably made from a single piece of relatively rigid material. A compliant seal covers at least the portion of the rigid seal support on surface facing the insertion head and extends outwardly from the support. The compliant seal is positioned to engage the front face of the panel providing a water barrier surrounding the aperture. The present invention does not rattle or produce other undesirable sounds during vehicle operation due to the compliant seal. The fastener allows an object to be attached anywhere in the vehicle simply by providing an aperture at a desired location including in floor boards, door panels and trunk, decklids and side panels.

7 Claims, 1 Drawing Sheet

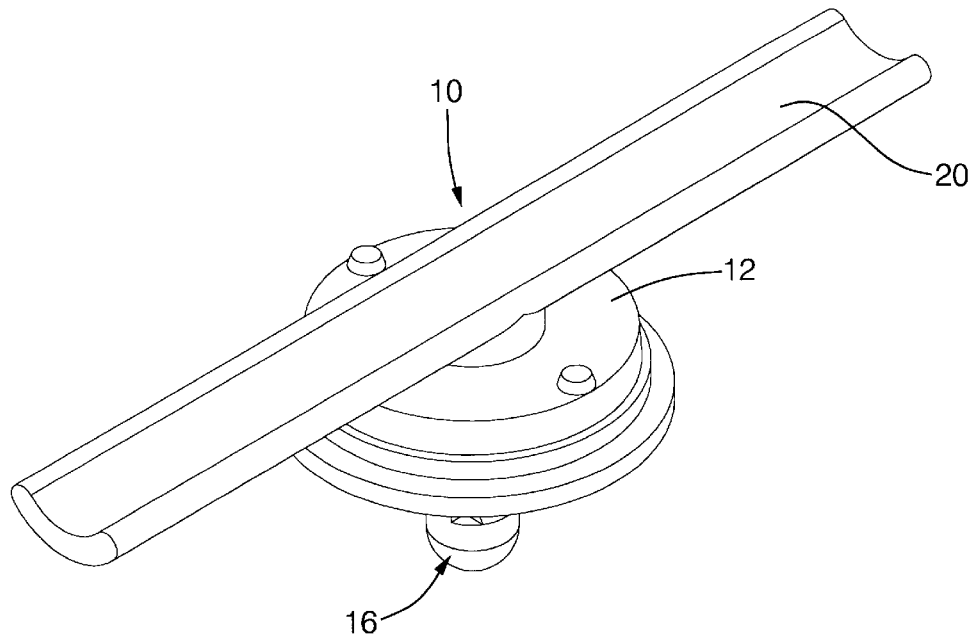
FIG. 1
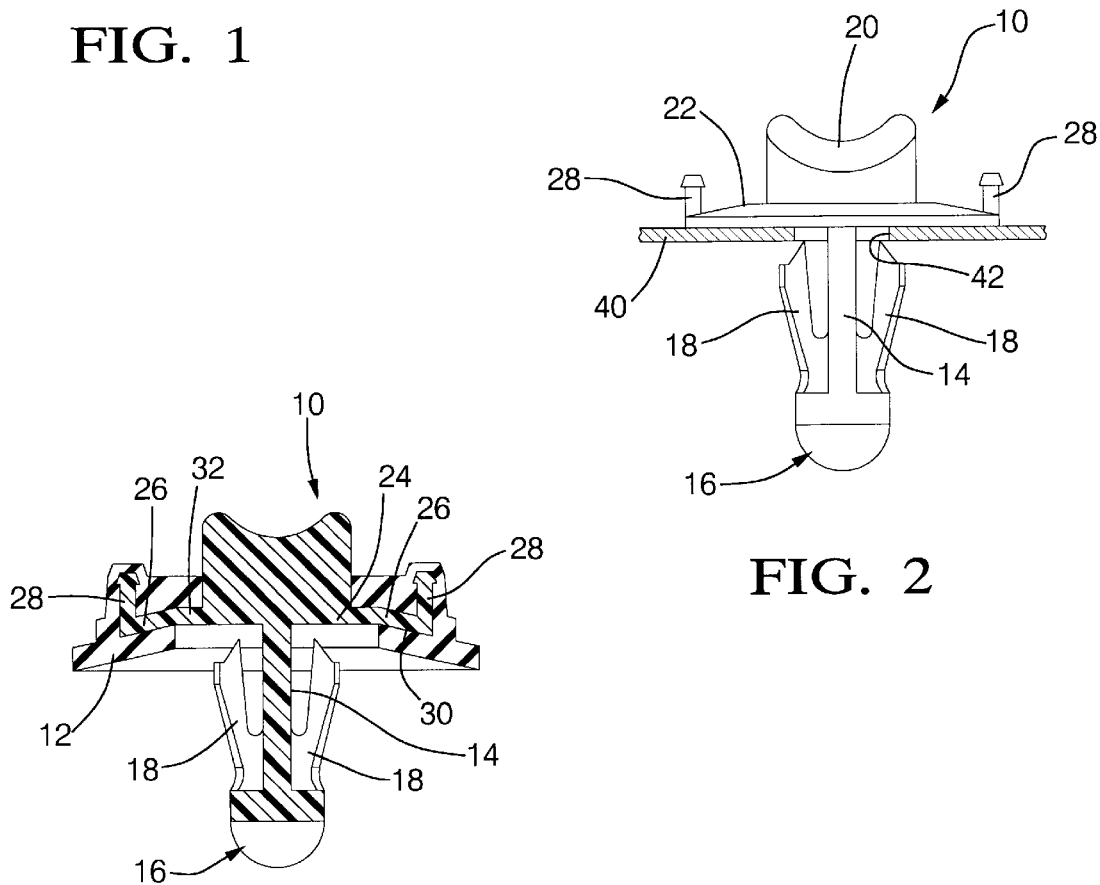
FIG. 2
FIG. 3

FASTENER WITH MOLDED-ON COMPLIANT SEAL

TECHNICAL FIELD

This invention relates to fasteners, and more particularly to fasteners for holding objects to an apertured panel.

BACKGROUND OF THE INVENTION

A variety of fasteners are known for connecting an object to an apertured panel. Such fasteners have heretofore been widely used in vehicle applications. The fasteners often include a shaft having an insertion head at a first end for inserting through an apertured panel and locking against a rear face of the panel. A base is provided at the other end of the shaft for securing an object thereto. The aperture formed in the panel must be wide enough to receive the insertion head. As a result, the aperture is often wider than the shaft. This causes the fastener to rotate or spin under vibration often causing undesirable rattling sounds as the vehicle is operated. Heretofore, use of such fasteners have been prohibited in expected dry areas in the vehicle such as the passenger compartment, floor board, or trunk due to water intrusion through the aperture.

The present invention provides alternatives to and advantages over the prior art.

SUMMARY OF THE INVENTION

The invention includes a fastener with a molded-on compliant seal having a fastener portion including a shaft and an insertion head at a first end for extending through an apertured panel and locking against a rear face thereof. A base for attaching an object thereto is provided at the second end of the shaft. A rigid seal support extends outwardly from the shaft at a location between the first and second ends. The fastener portion including shaft, insertion head, base and seal support are preferably made from a single piece of relatively rigid material. A compliant seal covers at least the portion of the rigid seal support on surface facing the insertion head and extends outwardly from the support. The compliant seal is positioned to engage the front face of the panel providing a water barrier surrounding the aperture. The present invention does not rattle or produce other undesirable sounds during vehicle operation due to the compliant seal. The fastener allows an object to be attached anywhere in the vehicle simply by providing an aperture at a desired location including in floor boards, door panels and trunk, decklids and side panels.

These and other objects, features and advantages of the present invention will become apparent from the following brief description of the drawings, detailed description and appended claims and drawings.

BRIEF DESCRIPTION OF THE DRAWINGS

FIG. 1 is a perspective view of a fastener with a molded-on compliant seal according to the present invention;

FIG. 2 is a side view of the fastener portion of the fastener with a molded-on compliant seal shown in FIG. 1; and FIG. 3 is a partial sectional view taken along lines 3—3 of FIG. 1.

DESCRIPTION OF THE PREFERRED EMBODIMENT

FIG. 1 is a perspective view of a fastener with a molded-on compliant seal. The invention includes a single piece fastener portion 10 with a compliant seal 12 molded on the fastener portion 10. As shown in FIG. 2, the single piece fastener portion 10 includes a shaft 14 having an insertion head 16 at a first end for extending through an apertured panel 40 and locking against a rear face. The insertion head 16 includes a plurality of flexible lock arms 18 extending outwardly from the shaft 14. A base 20 is provided at a second end of the shaft 14. Preferably the base 20 is an elongated bar having an arcuate shape to facilitate taping a wire harness thereto. A seal support 22 extends outwardly from the stem 14 between the first and second ends. The seal support 22 is preferably relatively rigid. As best seen in FIG. 3, the rigid seal support 22 includes a flat central portion 24 adjacent the stem which may be disc shaped and an annular wing 26 extending out from the central portion 24 at an angle. Diametrically opposed mushroomed pins 28 extend upwardly from the annular wing 26 towards the base. The fastener portion 10 may be made from a variety of polymeric materials but preferably is nylon.

As illustrated in FIG. 3, a compliant seal 12 covers at least a first face 30 of the annular wing nearest the insertion head 16 and preferably covers the second face 32 of the annular wing and the pins. The compliant seal 12 is made by insert molding a compliant material to the rigid seal support 22. The compliant material preferably is an elastomer such as styrene-butadiene copolymer, neoprene, nitrile rubber, butyl rubber, polysulfide rubber, EPDM rubber, silicone rubber and polyurethane rubber, and preferably is a thermoplastic elastomer available under the tradename Santoprene™. The compliant seal 12 preferably covers the pins 28 to prevent the seal from rotating on the rigid seal support. The compliant material preferably extends radially outward from the wing 26 of the seal support to provide a sealing lip around the aperture 42. Preferably the seal support 22 and compliant seal 12 have a concave surface nearest the insertion head 16.

We claim:

1. A fastener with a molded-on compliant seal for insertion into a panel having an aperture comprising:

a fastener portion including a stem and and insertion head at a first end of the stem for extending through an aperture formed in a panel and locking against a rear face of the panel, a base at a second end of the stem for attaching an object thereto, a seal support extending outwardly from the stem between the first and second ends;

a compliant seal secured to the seal support for engaging a front face of the panel and sealing around the aperture formed in the panel, wherein the seal support comprises a thick disc shaped central portion and a thinner annular wing extending from the central portion at an angle, and further comprising diametrically opposed pins extending upwardly from the annular wings toward the second end of the shaft.

2. A fastener as set forth in claim 1 wherein the compliant seal covers a face of the annular wing closest to the insertion head.

3. A fastener as set forth in claim 2 for the compliant seal covers the annular wing and pins.

4. A fastener with a molded-on compliant seal for insertion in a panel having an aperture formed therein comprising:

a fastener portion including a stem and an insertion head at a first end of the stem for extending through an aperture formed in a panel and locking against a rear face of the panel, a base at a second end of the stem for attaching an object thereto, a seal support extending outwardly from the stem between the first and second ends, the seal support having a thick disc shaped central portion and a thinner annular wing extending from the central portion at an angle, and the seal support having an upper face nearest the base and a lower face nearest the insertion head, a compliant seal secured to the seal support and covering the upper face of the thick disc shaped central portion and upper face of the thinner annular wing and the lower face of the thinner annular wing and constructed arranged to engage a front face of the panel to provide a water tight seal around the aperture.

5. A fastener as set forth in claim 4 wherein the compliant seal comprises an elastomer material.

6. A fastener as set forth in claim 4 further comprising diametrically opposed pins extending upwardly from the annular wings toward the second end of the shaft and wherein the diametrically opposed ends are also covered by the compliant seal.

7. A fastener as set forth in claim 6 wherein the base comprises an elongated bar member constructed and arranged for attaching a wire harness thereto.

* * * * *